United States Patent
Guim Bernat et al.

(10) Patent No.: US 12,298,861 B2
(45) Date of Patent: May 13, 2025

(54) HIGH-AVAILABILITY MEMORY REPLICATION IN ONE OR MORE NETWORK DEVICES

(71) Applicant: Intel Corporation, Santa Clara, CA (US)

(72) Inventors: Francesc Guim Bernat, Barcelona (ES); Karthik Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 785 days.

(21) Appl. No.: 17/339,164

(22) Filed: Jun. 4, 2021

(65) Prior Publication Data
US 2021/0294702 A1   Sep. 23, 2021

(51) Int. Cl.
G06F 11/14   (2006.01)
G06F 3/06   (2006.01)
G06F 15/173   (2006.01)

(52) U.S. Cl.
CPC ........ *G06F 11/1464* (2013.01); *G06F 3/0619* (2013.01); *G06F 3/065* (2013.01); *G06F 3/067* (2013.01); *G06F 11/1451* (2013.01); *G06F 11/1469* (2013.01); *G06F 15/17331* (2013.01)

(58) Field of Classification Search
None
See application file for complete search history.

(56) References Cited

U.S. PATENT DOCUMENTS

| | | | |
|---|---|---|---|
| 10,275,180 B2 | 4/2019 | Ballapuram et al. | |
| 10,691,368 B2 | 6/2020 | Kachare et al. | |
| 2009/0157766 A1* | 6/2009 | Shen | G06F 16/2379 |
| 2012/0084383 A1* | 4/2012 | Bernbo | H04L 12/1845 |
| | | | 709/213 |
| 2014/0177634 A1* | 6/2014 | Jiang | H04L 45/74 |
| | | | 370/392 |
| 2014/0324951 A1* | 10/2014 | Kim | H04L 67/1097 |
| | | | 709/203 |
| 2015/0012607 A1* | 1/2015 | Cayton | H04L 67/1097 |
| | | | 709/212 |
| 2017/0094002 A1 | 3/2017 | Kumar et al. | |

(Continued)

OTHER PUBLICATIONS

Harding, Scharon, "What is a RAID Controller? A Basic Definition", Tom's Hardware, https://www.tomshardware.com/reviews/raid-controller-card-definition,5756.html, Published Aug. 23, 2018, 4 pages.

(Continued)

*Primary Examiner* — Charles J Choi
(74) *Attorney, Agent, or Firm* — Essential Patents Group, LLP; Christopher K. Gagne

(57) ABSTRACT

Examples described herein relate to a switch device. The switch device can perform replication of content stored in a source memory region to two or more memory regions available from two or more nodes, wherein the two or more memory regions available from two or more nodes are identified to the circuitry for use to store replicated content. The two or more nodes can be on different racks than that of a memory device that stores the source memory region. The switch device can select the two or more memory regions available from two or more nodes based, at least, in part on resiliency criteria associated with the two or more nodes.

20 Claims, 9 Drawing Sheets

(56) References Cited

U.S. PATENT DOCUMENTS

2018/0007134 A1* 1/2018 Guim Bernat ........ G06F 3/0617
2018/0316760 A1 11/2018 Chernin et al.
2020/0167239 A1 5/2020 Rajaa et al.

OTHER PUBLICATIONS

Russell, Robert D., "RDMA programming concepts", Open Fabrics Alliance, Inc., Apr. 18, 2013, 68 pages.
International Search Report and Written Opinion for PCT Patent Application No. PCT/US22/2179, Mailed Jun. 30, 2022, 13 pages.
Extended European Search Report from European Patent Application No. 22816602.1 notified Aug. 5, 2024, 10 pgs.

* cited by examiner

HIGH-AVAILABILITY MEMORY REPLICATION IN ONE OR MORE NETWORK DEVICES

Virtualization and containerization have emerged for modularizing software execution (e.g., virtual machines (VMs) and containers) from the underlying hardware, enabling migration of software based on real-time characteristics including peak traffic, power management, service level agreement (SLA) governance, and so forth. In particular, it is possible to spin up in-memory instances spanning hundreds of gigabytes of memory using VMs or containers. For enterprise and mission critical applications running in these environments, high availability (HA) and disaster recovery are important for business continuity purposes. For example, a small business hosting their payment system in a database cannot have downtime in the case of hardware failures or issues. Some of the key metrics used for tracking the "recovery" are the recovery point objective (RPO) and recovery time objective (RTO). RPO addresses the allowable level of data loss by defining the acceptable level of time between a production-class backup and an incident. RTO is the time required to ensure all systems are back to normal.

FIG. 1 depicts an example of metrics used by mission critical applications to compute business downtime due to system failures. It can be seen that there is back up performed to the replicas (either synchronous or asynchronous). After the "System Down" point in time, the time before the system is operational again is the system TRO (recovery time objective). In the case of in-memory databases which hold data in-memory for near real-time processing, the data needs to be replicated in-memory to keep the RTO acceptable, since loading data from shared storage into memory can take an unacceptable amount of time.

In order to facilitate some of these metrics to be within acceptable parameters, in-memory replication may be used to make sure there is sufficient coverage if there is a hardware failure. For example, hardware failures can be at the node level, rack level, or data center level. In order to mitigate against these possibilities, one high availability strategy to keep an in-memory mirror copy in a different rack within the data center, and a second disaster-recovery copy of data in a different datacenter. In a data center, a high availability copy may be stored in a different rack (e.g., synchronous copy), and a disaster recovery copy that is further away (e.g., asynchronous copy). A rack can include a switch coupled to one or more servers and the switch can provide network access to the one or more servers.

For Redis database, as an example, replicas are managed by the application. Migration policies ensure that the VM distancing is such that there is no single point of failure so that two VMs, primary and replica, do not share resources (e.g., physical rack, memory pool, or storage pool). This can be challenging when the goal of virtualization and cloud computing is to abstract away these physical details from the end user and application and migrations can be decided by the underlying infrastructure and not by the application itself.

Replication managed by the application may involve the application keeping track of data copies and multicasting data to other memory devices. Such replication management can involve software overhead of making data copies in the local node, such as copy-on-write, and invoking a network stack for packet formation and transmission. Compute resources in a node that runs the application can be burdened and data security is a concern. In some cases, replicas are to be encrypted, but storing the keys in a single point of failure (e.g., only in the local node) can lead to loss of the keys and inability to decrypt data.

DETAILED DESCRIPTION

A switch can manage data replication on behalf of applications (e.g., VM, containers, Docker containers, services, microservices, and so forth). A switch or network device can be configured to perform data replication (e.g., HA) for data to multiple nodes. A memory region (e.g., address range) can be marked as mirrored and a network device and server resources can perform mirroring of data in the mirrored memory region to replicate data as per pre-configured replication rules. The network device can manage scheduling of data replication and can use co-distancing or location as a parameter for decisions of what devices to use to replicate data. A network device can multicast the data to make one or more replicas in different memory devices. Replicas can be stored on different racks or different power domains (e.g., different power supplies) such that if a memory device that stores a replica fails, another memory device in a different rack or power domain, that does not fail, can provide the data. Data that is replicated can include one or more of: objects, Binary Large OBjects (BLOBs), files, images, audio files, video files, and/or blocks.

Hypervisors and container-infrastructures (e.g., Kubernetes) can coordinate with network devices to facilitate migration and high-availability-based replication rules. Technologies described herein can be utilized at least in (1) Internet of Things (IoT) maintenance; (2) autonomous driving; or (3) other Unmanned Aerial Vehicle (UAV) devices performing IoT sampling or agriculture analysis. Technologies described herein can be utilized at least in a data lake and/or data warehouse. Technologies described herein can be utilized by Memcached (e.g., key-value store for data such as strings or objects from results of database calls, API calls, or page rendering. Technologies described herein can be utilized in connection with data recovery from disaster recovery.

Figure 1:
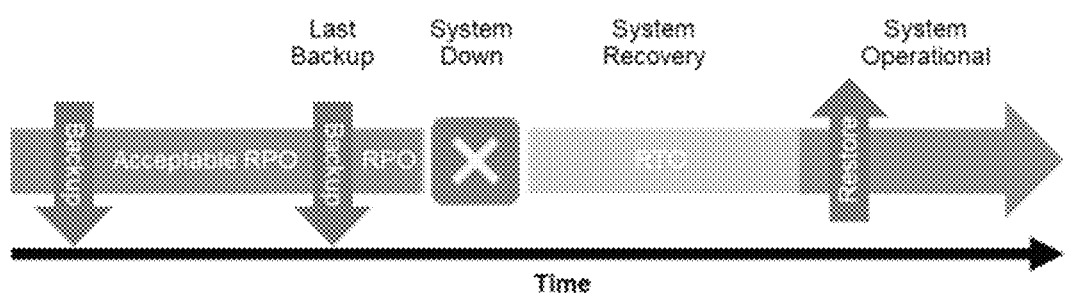
FIG. 1 depicts an example of metrics used by mission critical applications to compute business downtime due to system failures.
Figure 2:
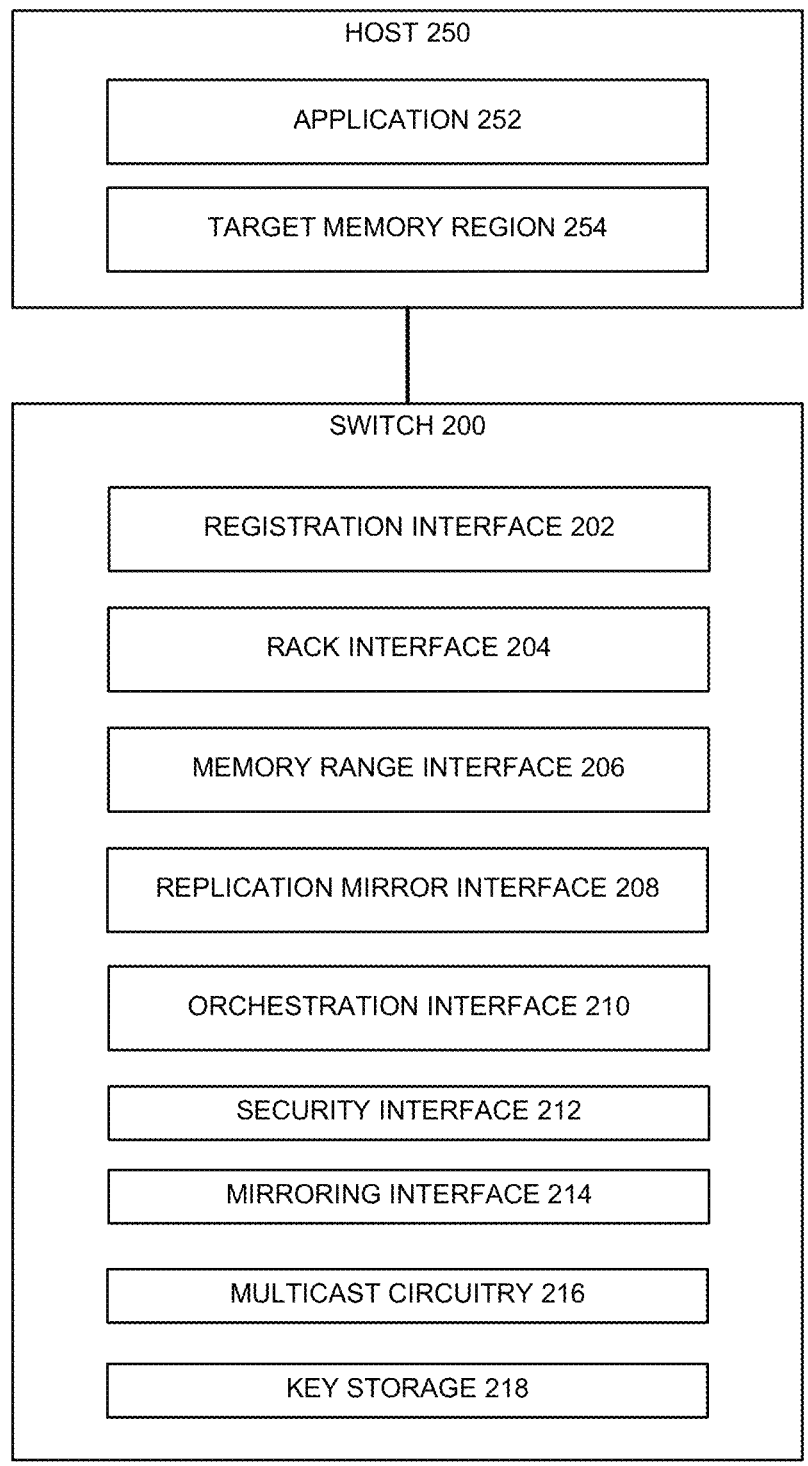
FIG. 2 depicts an example of interfaces provided by a switch.

FIG. 2 depicts an example of interfaces provided by a switch. Switch 200 can expose one or more interfaces that allow access and configuration of switch 200 to perform data replication to different memory devices. For example, an interface can include an application program interface (API), command line interface (CLI), script, binary, kernel, and so forth. Host 250 can execute application 252 and include a target memory region 254 in a memory device. Application 252 can include a VM, container, service, microservice, and so forth. One or more processors can execute application 252.

Registration interface 202 can allow one or more nodes that are connected to switch 200 via an interface (e.g., device interface, network interface controller, host fabric interface, IPU, and so forth) to register information concerning data replication capabilities. For example, information conveyed through registration interface 202 can include one or more of: node identifier (ID), rack ID of rack that hosts node(s), and/or resiliency or reliability of media. Resiliency or reliability of media can represent a level of reliability of media that stores data at the node. For example, resiliency or reliability of media can be represented as a value (e.g., 0-100) that can be based on one or a combination of: a number of power supply ports, replication of packets that are sent to a target, availability of back-up power supply (e.g., uninterruptible power source (UPS)), number of network devices to receive and/or transmit packets to write data to or read data from the media, error correction capabilities (e.g., use of error correction coding (ECC)), use of reliability, availability and serviceability (RAS) features, age of media, number of uncorrectable errors in a time window, and so forth. A node can include one or more of: one or more memory devices, one or more storage devices, one or more persistent memory devices, one or more compute devices, one or more accelerators, one or more network interfaces, and so forth. A node can communicate with switch 200 using a network, fabric, bus, or other interface.

Rack interface 204 can allow registering racks that are connected into switch 200. Using rack interface 204, a node in a rack can provide one or more of: rack ID and/or resiliency of rack. For example resiliency of rack can be represented as a value (e.g., 0-100) that can represent for memory and/or storage media available in the rack a number of power supply ports, availability of back-up power supply, error correction capabilities, age of media, number of uncorrectable errors in a time window, and so forth. A rack can include a switch (e.g., top of rack (ToR) switch, end of row (EoR), or middle of row (MoR) switch) coupled to one or more servers or nodes.

Memory range interface 206 (e.g., Donated Memory Management) can permit a particular node to register a memory address range that is available or donated to switch 200 for use to replicate data. Information conveyed through memory range interface 206 can include one or more of: Node ID and address range. For example, an address range can represent a range of virtual addresses.

Replication mirror interface 208 can permit a software stack (e.g., application 252, operating system (OS), and/or driver for switch 200) to create a replication mirror for a particular application. Replication mirror interface 208 can receive from a software stack executing on a server or host system one or more of: application ID, address range [A,B] (e.g., target memory region 254), and/or minimum level of reliability or resiliency of a media and/or rack. The memory address range (e.g., target memory region 254) can represent a range of memory addresses whereby stored data is to be replicated by circuitry of switch 200 to other node(s). In some examples, a memory address range may be identified by an application ID and address range. Based on information received through replication mirror interface 208, circuitry in switch 200 can identify one or more nodes that can store replicated data to achieve at least the level of reliability or resiliency. For example, the level of reliability can be based on various reliability or resiliency factors of the rack and/or one or more nodes. A cloud service provider (CSP) or tenant can define how a level of reliability or resiliency is determined based on level of reliability or resiliency of the rack and/or one or more nodes.

Orchestration interface 210 can be used by an orchestrator (e.g., Kubernetes, European Telecommunications Standards Institute (ETSI) specifications, Open Source NFV Management and Orchestration (MANO) from ETSI's Open Source Mano (OSM) group, and so forth) to retrieve identifiers of nodes where a particular application and address range of data is replicated. Orchestrator can create data migration and/or replication policies for VMs or containers. In some cases, orchestrator can migrate a VM to a node that stores replicated data for that VM and permit local access to such replicated data (e.g., through a bus or device interface instead of through use of network traversing packets).

Security interface 212 can allow one or more applications or orchestrator to register keys. In some examples, switch 200 can utilize circuitry to encrypt data using a key for data writes prior to sending data to a destination memory region. The replicated data can be encrypted and stored in a memory region of another node. In some examples, a copy of keys can be stored in a secure region in switch 200 in order to have a copy of the keys in case a node that stores replicated data fails and data is to be accessed from another node.

Mirroring interface 214 can allow application 252 to command switch 200 to replicate data. Application 252 can identify to switch 200 one or more of: payload, address range (e.g., target memory region 254), mode of replication (e.g., asynchronous or synchronous), and/or whether data is to be encrypted or not prior to transmission to another node. In some examples, a write to a registered target memory region 254 in a memory device can trigger switch 200 to replicate data written to target memory region 254. For example, when the software stack writes to this memory address region of its local memory, an application, service, OS and/or driver executing on host 250 may generate a remote direct memory access (RDMA) write command to switch 200 with the payload and/or memory address that the payload is written to. Various examples of RDMA include, but are not limited to, Internet Wide Area RDMA Protocol (iWARP), RDMA over Converged Ethernet (RoCE), or others.

After the RDMA request reaches switch 200, switch 200 can issue one or more RDMA write commands to destination nodes that include replication memory regions.

As described in more detail herein, switch 200 can identify which memory regions at other nodes to use store replica data. In some examples, switch can utilize HA multicast circuitry 216 in order to transmit replicas of data to one or more other nodes. If the request to replicate data is asynchronous, switch 200 can indicate to application 252 that copies of replica data have been sent but an acknowledgement of copy completion was not received and after copy completion, HA multicast circuitry 216 can indicate that data has been replicated. If the requested data replication is synchronous, an acknowledgement of completion can be issued to application 252 after the replication transactions are confirmed as completed by the target node(s).

Switch 200 can utilize key storage 218. Key storage 218 can include a set of persistent storage memory blocks that are used to back up configurations and keys utilized to encrypt and/or decrypt data. Configurations and keys can be retrieved using the corresponding management keys of a data center owner in an event of failure of switch 200 such as power failure to switch 200.

Figure 3A:
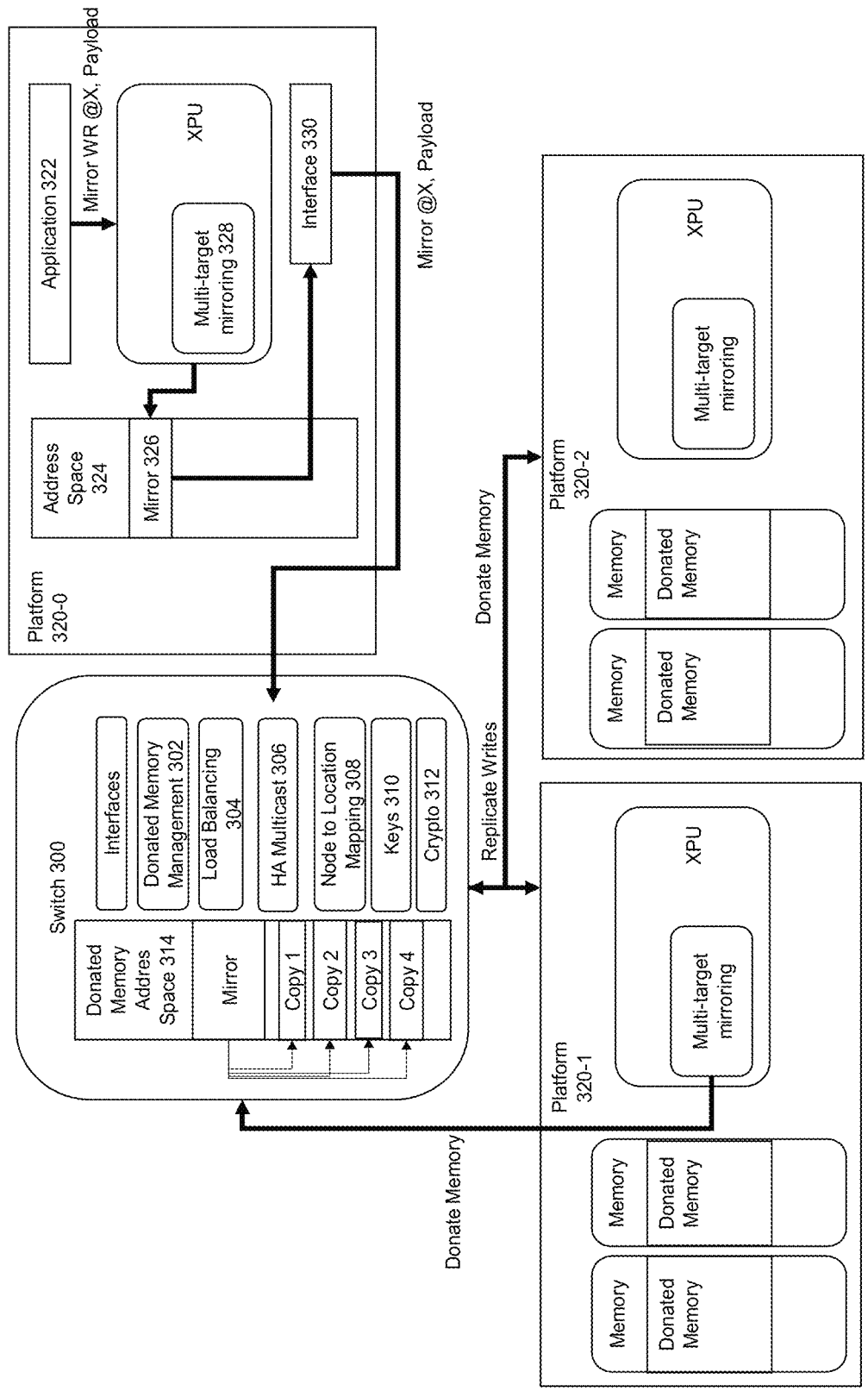
FIG. 3A depicts an example system.

FIG. 3A depicts an example system. In this example, platform 320-0 can execute application 322 that indicates that data is to be written to memory address (e.g., @X) within mirror region 326 of address space 324. Multi-target mirroring circuitry 328 can cause replication of data written to mirror 326 to donated memory regions in platform 320-1 and platform 320-2. Donated memory regions can be available to store replicas of the data written to mirror region 326. Although examples of multi-target mirroring are shown executing in XPUs of platforms, multi-target mirroring logic can be implemented as part of a memory controller, OS, driver, and others. Interface 330 can communicatively couple platform 320-0 to switch 300. Interface 330 can include a network interface controller, IPU, host fabric interface, or device interface.

Multi-target data mirror management 302 can receive indications of donated memory regions from platforms 320-1 and 320-2. Multi-target data mirror management 302 can select one or more donated memory to use to store replicas of data stored in mirror region 326 based on criteria described herein. Node to location mapping 308 can update donated memory address space 314 to represent locations in platforms 320-1 and 320-2 that store replicas of data stored in mirror region 326. Load balancing 304 can perform load balancing of read operations from platforms 320-1 and 320-2. HA multicast 306 can perform transmission of replica copies of data to platforms 320-1 and 320-2 using technologies such as remote direct memory access (RDMA), NVMe over Fabrics (NVMe-oF), Gen-Z, or others.

Keys 310 can used by cryptography circuitry 312 to encrypt data prior to transmission to platforms 320-1 and 320-2. Platforms 320-1 and 320-2 can store encrypted data in donated memory regions.

Figure 3B:
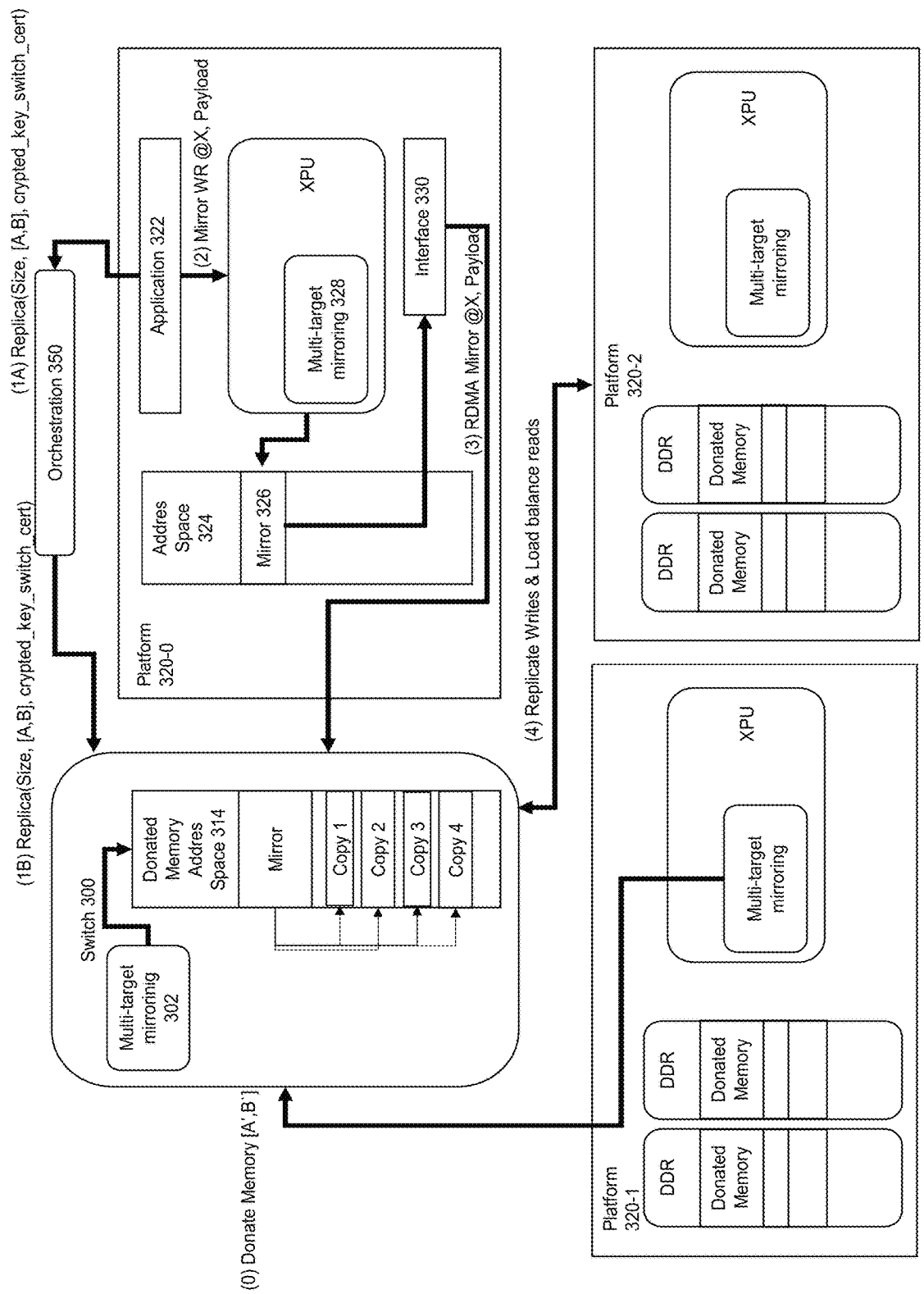
FIG. 3B depicts an example operation of a system.

FIG. 3B depicts an example operation of switch. Switch 300 can utilize multi-target data mirroring management 302 to expose an interface that can be used by platforms of one or more data centers and/or edge network elements to allocate memory address regions to, at least, store replicated data. At (0), platforms 320-1 and 320-2 can donate memory regions to store replica data to switch 300. Multi-target data mirroring management 302 can expose a second interface (with the corresponding logic) that can be used by application 322 (e.g., VM, container, microservice, and so forth) to request an allocation of a particular memory size mapped into a memory region 326 that is to be replicated in order to achieve a given amount of reliability (e.g., 99.9%). For example, a microservice can be characterized by one or more of: use of fine-grained interfaces (to independently deployable services), polyglot programming (e.g., code written in multiple languages to capture additional functionality and efficiency not available in a single language), or lightweight container or virtual machine deployment, and decentralized continuous microservice delivery.

At (1A), application 322 can indicate to orchestration 350 identification of mirror region 326 and keys to be used to encrypt data to be replicated. At (1B), orchestration 350 can provide the identification of mirror region 326 and keys to be used to encrypt data to be replicated to switch 300. In some examples, at (2), when application 322 writes into mirror memory region 326 that is designated to be replicated, then at (3) a memory controller and/or multi-target data mirroring management 302 on platform 320-0 can send the data to switch 300 via interface 330 and instruct switch 300 to replicate content of the memory region into donated memory regions of memory devices of platforms 320-1 and 320-2. Local memory of platform 320-0 can be memory connected to an XPU using a memory bus or memory interface. In some examples, an RDMA operation can be performed to copy data from mirror 326 to switch 300. In some examples, a software stack (e.g., libraries) can cause data replication of data in mirror 326 on behalf of application 322.

If switch 300 has enough donated or allocated memory from other nodes to cover replication of data for an application, switch 300 can inform application 322 executing on platform 320-0 that there is enough memory for replication. Switch 300 can select different platforms 320-1 and 320-2 to store data in donated memory regions in order to achieve the requested level of replication. For example, switch 300 can select memory regions of platforms 320-1 and 320-2 to store replicated data based in power domains, rack location, resiliency factors, and other factors.

At (4), switch 300 can cause the payload to be transmitted to one or more regions of memory allocated for replication in other platforms 320-1 and 320-2. Switch 300 can perform asynchronous and synchronous replication. A synchronous copy can occur in a different rack in a same data center whereas an asynchronous copy can occur in a node that is outside the data center. Synchronous replication can write data to a storage device and its one or more replicas at the same or overlapping times and wait for completion of the replications to achieve synchronization of data copies. Asynchronous replication can replicate data after data is written to the primary storage or provide a relatively open time frame for completion of data replication. According to various embodiments, platform 320-0 can create symmetric or asymmetric keys can be used to encrypt the payload before being sent to the destination. Certificates can be used to establish security of data.

Application 322 can attempt to access data from local memory (including cache). But if the data is corrupted, application can check to see if replicated data is not corrupted. Application 322, OS, and/or driver can issue a notification to an orchestration and management system 350 to indicate data is corrupted or not retrievable. An OS and memory controller can deduce memory region from which the data is corrupted based on repeated errors from reading data from that memory region and can change a physical address to store the data. For example, a memory failure can occur if data is corrupted and data cannot be recovered using error correcting coding (ECC), XOR, cyclic redundancy check (CRC), and others. For example, if there are two or more bit errors in data stored at platform 320-0, then other replicas can be treated as truth and one or more fetched replicas can be stored in platform 320-0 for access.

Figure 4:
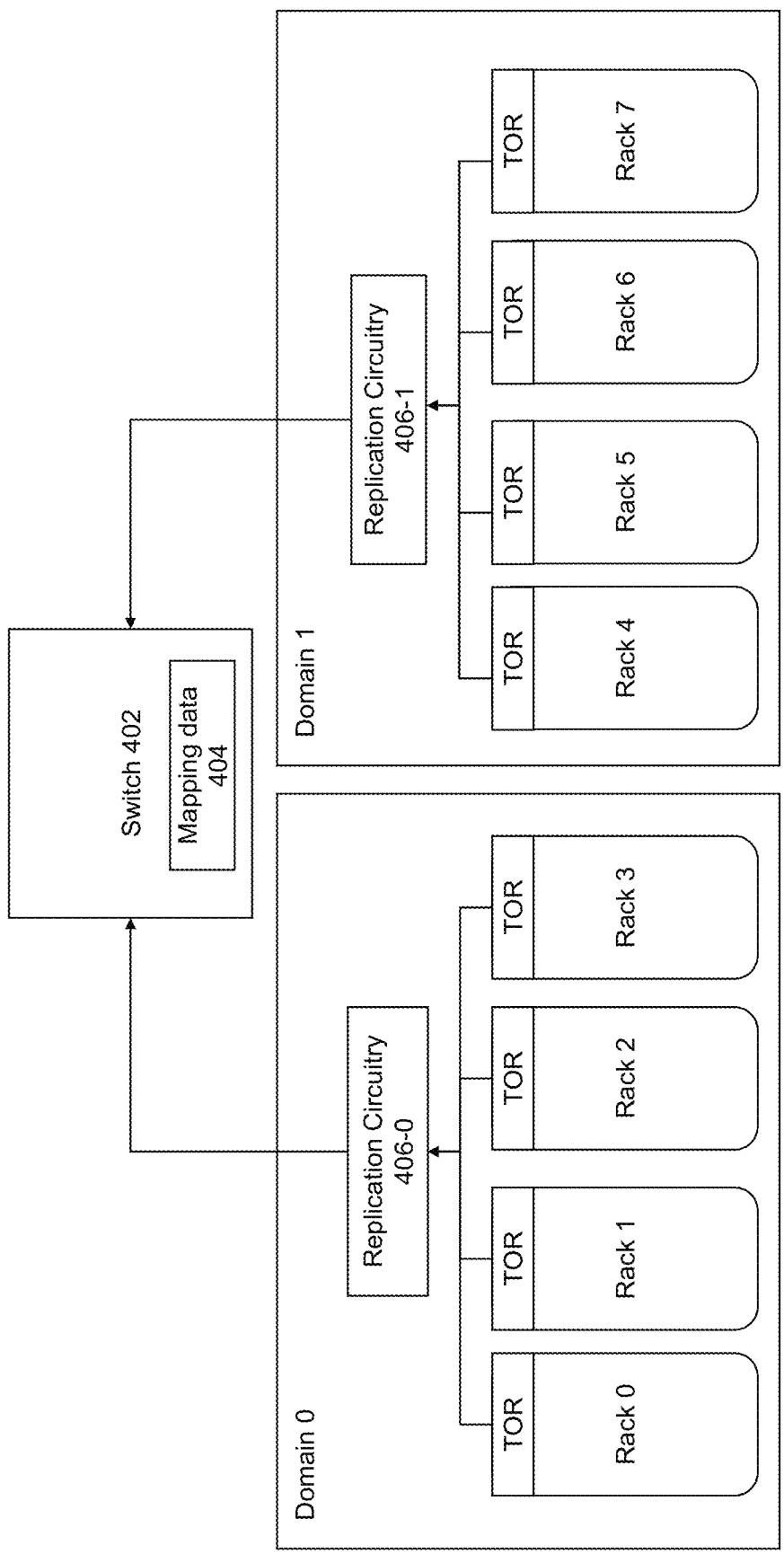
FIG. 4 depicts an example of replication domains.

FIG. 4 depicts an example of replication domains. In order to assist with scaling or increasing a number of available target replication memory regions, at the request of an application or other software, an orchestrator, operating system, or other system software can define replication domains that indicate a set of racks and nodes mapped to a switch and the set of racks and nodes are able to provide memory to store replicated data. For example, a data center can define failure domains so that replication can occur in particular domains. In this example, domain 0 includes replication circuitry 406-0 to perform replication of data to a memory domain donated by one or more servers of one or more of racks 0 to 3. In this example, domain 1 includes replication circuitry 406-1 to perform replication of data to a memory domain donated by one or more servers of one or more of racks 4 to 7. In some examples, replication circuitry 406-0 and/or 406-1 can perform one or more operations of multi-target data mirroring management 302, described earlier.

In some examples, switch 402 includes persistent memory that stores mappings data 404 of data replications at target memory devices. In case of failure of switch 402, mapping data 404 can be retrieved by a server platform for use to perform data replication or copied to another switch to perform data replication. For example, mapping data 404 can include at least the following fields in Table 1. Note that a rack can be associated with multiple domains.

TABLE 1

| Replication domain identifier | Associated Rack identifiers |
|---|---|
| Domain 1 | Racks 1-4 |
| Domain 2 | Racks 4-7 |
| Domain 3 | Racks 7-15 |

Figure 5:
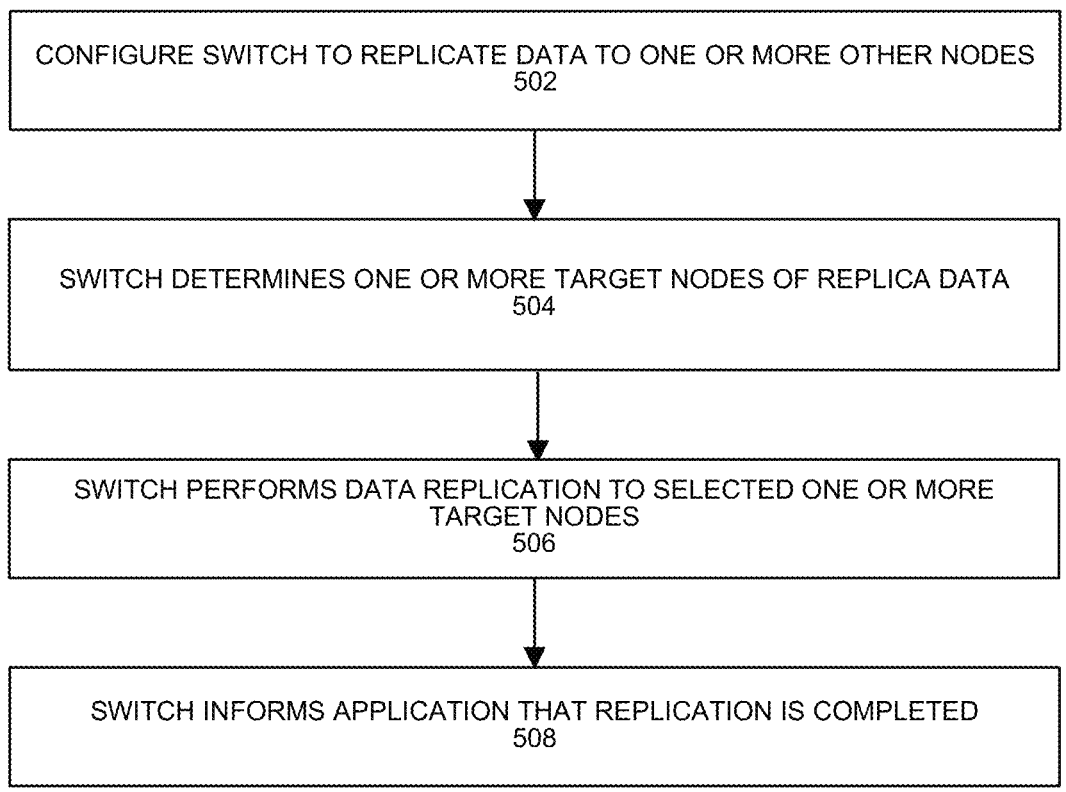
FIG. 5 depicts an example process.

FIG. 5 depicts an example process. At 502, a switch can be configured to replicate data stored in one or more regions of memory in a local node to one or more regions of memory that are available to store replicated data. For example, the switch can receive configuration of memory addresses that are available to store replicated data from one or more nodes. In some examples, the one or more nodes can utilize a different power supply than that of the switch that is to replicate data. In some examples, the one or more nodes can be positioned in a different rack than that of the switch that is to replicate data. At 504, the switch can determine one or more target nodes of replicate data. For example, determination that data replication is to take place can occur based on a request from an application to replicate data. For example, determination that data replication is to take place can occur based on an application writing to a region of memory that is designated as triggering replication by the switch and the switch can cause replication of data written to such region of memory to one or more memory regions of the one or more nodes that satisfy replication criteria. For example, replication criteria can be based on resiliency of the media in a node and/or rack that includes the node.

At 506, the switch can perform data replication to one or more memory regions of one or more target nodes. In some examples, the switch can utilize an RDMA protocol to copy data to a receiver memory region by use of send and receive queue pairs. At 508, the switch can indicate completion of the data replication to the application.

Although examples herein are described with respect to a switch, any network device such as a network interface card, network interface controller, SmartNIC, infrastructure processing unit (IPU), data processing unit (DPU), or combination thereof can perform one or more aspects of the embodiments described herein.

Figure 6A:
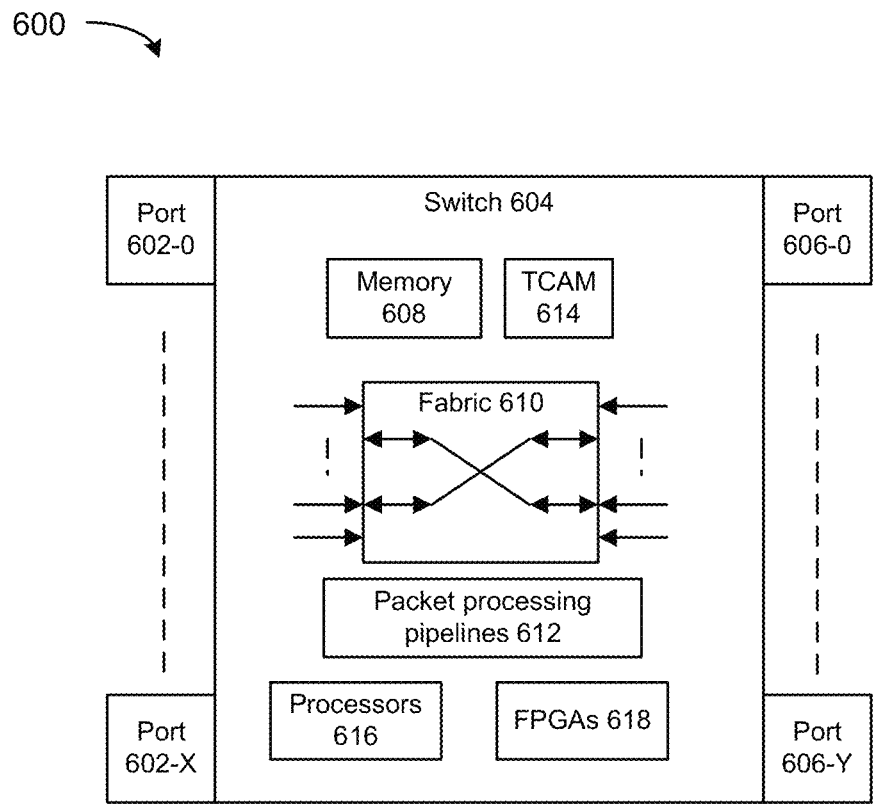
FIG. 6A depicts an example switch.

FIG. 6A depicts an example switch. Various resources in the switch (e.g., packet processing pipelines 612, processors 616, and/or FPGAs 618) can perform data replication as described herein. Switch 604 can route packets or frames of any format or in accordance with any specification from any port 602-0 to 602-X to any of ports 606-0 to 606-Y (or vice versa). Any of ports 602-0 to 602-X can be connected to a network of one or more interconnected devices. Similarly, any of ports 606-0 to 606-X can be connected to a network of one or more interconnected devices.

In some examples, switch fabric 610 can provide routing of packets from one or more ingress ports for processing prior to egress from switch 604. Switch fabric 610 can be implemented as one or more multi-hop topologies, where example topologies include torus, butterflies, buffered multistage, etc., or shared memory switch fabric (SMSF), among other implementations. SMSF can be any switch fabric connected to ingress ports and all egress ports in the switch, where ingress subsystems write (store) packet segments into the fabric's memory, while the egress subsystems read (fetch) packet segments from the fabric's memory.

Memory 608 can be configured to store packets received at ports prior to egress from one or more ports. Packet processing pipelines 612 can determine which port to transfer packets or frames to using a table that maps packet characteristics with an associated output port. Packet processing pipelines 612 can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines 612 can implement access control list (ACL) or packet drops due to queue overflow. Packet processing pipelines 612 can be configured to add operation and telemetry data concerning switch 604 to a packet prior to its egress.

Configuration of operation of packet processing pipelines 612, including its data plane, can be programmed using P4, C, Python, Broadcom Network Programming Language (NPL), or x86 compatible executable binaries or other executable binaries. Processors 616 and FPGAs 618 can be utilized for packet processing or modification.

Figure 6B:
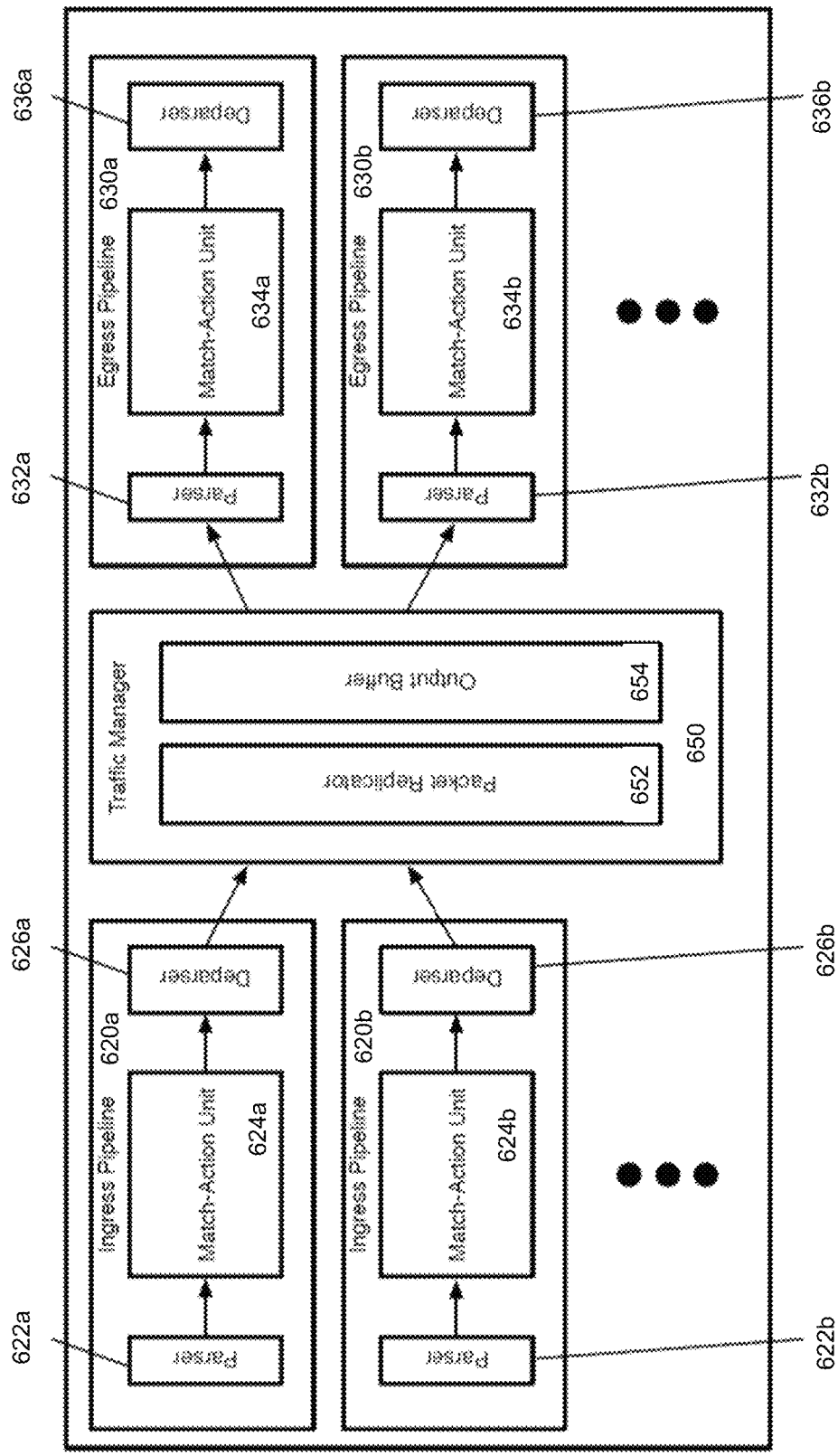
FIG. 6B depicts an example programmable packet processing pipeline.

FIG. 6B depicts an example programmable packet processing pipeline that can be used in a switch or router to perform data replication as described herein. A network interface or IPU can include a programmable packet processing pipeline to perform data replication described herein. For example, FIG. 6B illustrates several ingress pipelines 620, a traffic management unit (referred to as a traffic manager) 650, and several egress pipelines 630. Though shown as separate structures, in some embodiments the ingress pipelines 620 and the egress pipelines 630 can use the same circuitry resources. In some embodiments, the pipeline circuitry is configured to process ingress and/or egress pipeline packets synchronously, as well as non-packet data. That is, a particular stage of the pipeline may process any combination of an ingress packet, an egress packet, and non-packet data in the same clock cycle. However, in other embodiments, the ingress and egress pipelines are separate circuitry. In some of these other embodiments, the ingress pipelines also process the non-packet data.

In some examples, in response to receiving a packet, the packet is directed to one of the ingress pipelines 620 where an ingress pipeline which may correspond to one or more ports of a hardware forwarding element. After passing through the selected ingress pipeline 620, the packet is sent to the traffic manager 650, where the packet is enqueued and placed in the output buffer 654. In some embodiments, the ingress pipeline 620 that processes the packet specifies into which queue the packet is to be placed by the traffic manager 650 (e.g., based on the destination of the packet or a flow identifier of the packet). The traffic manager 650 then dispatches the packet to the appropriate egress pipeline 630 where an egress pipeline may correspond to one or more ports of the forwarding element. In some embodiments, there is no necessary correlation between which of the ingress pipelines 620 processes a packet and to which of the egress pipelines 630 the traffic manager 650 dispatches the packet. That is, a packet might be initially processed by ingress pipeline 620*b* after receipt through a first port, and then subsequently by egress pipeline 630*a* to be sent out a second port, etc.

A least one ingress pipeline 620 includes a parser 622, a match-action unit (MAU) 624, and a deparser 626. Similarly, egress pipeline 630 can include a parser 632, a MAU 634, and a deparser 636. The parser 622 or 632, in some embodiments, receives a packet as a formatted collection of bits in a particular order, and parses the packet into its constituent header fields. In some examples, the parser starts from the beginning of the packet and assigns header fields to fields (e.g., data containers) for processing. In some embodiments, the parser 622 or 632 separates out the packet headers (up to a designated point) from the payload of the packet, and sends the payload (or the entire packet, including the headers and payload) directly to the deparser without passing through the MAU processing.

The MAU 624 or 634 can perform processing on the packet data. In some embodiments, the MAU includes a sequence of stages, with each stage including one or more match tables and an action engine. A match table can include a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage can perform the actions on the packet, which is then sent to the next stage of the MAU.

The deparser 626 or 636 can reconstruct the packet using a packet header vector (PHV) as modified by the MAU 624 or 634 and the payload received directly from the parser 622 or 632. The deparser can construct a packet that can be sent out over the physical network, or to the traffic manager 650. In some embodiments, a deparser can construct this packet based on data received along with the PHV that specifies the protocols to include in the packet header, as well as its own stored list of data container locations for each possible protocol's header fields. For example, data replication can be implemented by MAUs 624 or 634.

Traffic manager 650 can include a packet replicator 652 and output buffer 654. In some embodiments, the traffic manager 650 may include other components, such as a feedback generator for sending signals regarding output port failures, a series of queues and schedulers for these queues, queue state analysis components, as well as additional components. The packet replicator 652 of some embodiments performs replication for broadcast/multicast packets, generating multiple packets to be added to the output buffer (e.g., to be distributed to different egress pipelines).

Output buffer 654 can be part of a queuing and buffering system of the traffic manager in some embodiments. Traffic manager 650 can provide a shared buffer that accommodates any queuing delays in the egress pipelines. In some embodiments, this shared output buffer 654 can store packet data, while references (e.g., pointers) to that packet data are kept in different queues for each egress pipeline 630. The egress pipelines can request their respective data from the common data buffer using a queuing policy that is control-plane configurable. When a packet data reference reaches the head of its queue and is scheduled for dequeuing, the corresponding packet data can be read out of the output buffer 654 and into the corresponding egress pipeline 630. In some embodiments, packet data may be referenced by multiple pipelines (e.g., for a multicast packet). In this case, the packet data is not removed from this output buffer 654 until all references to the packet data have cleared their respective queues.

Figure 7:
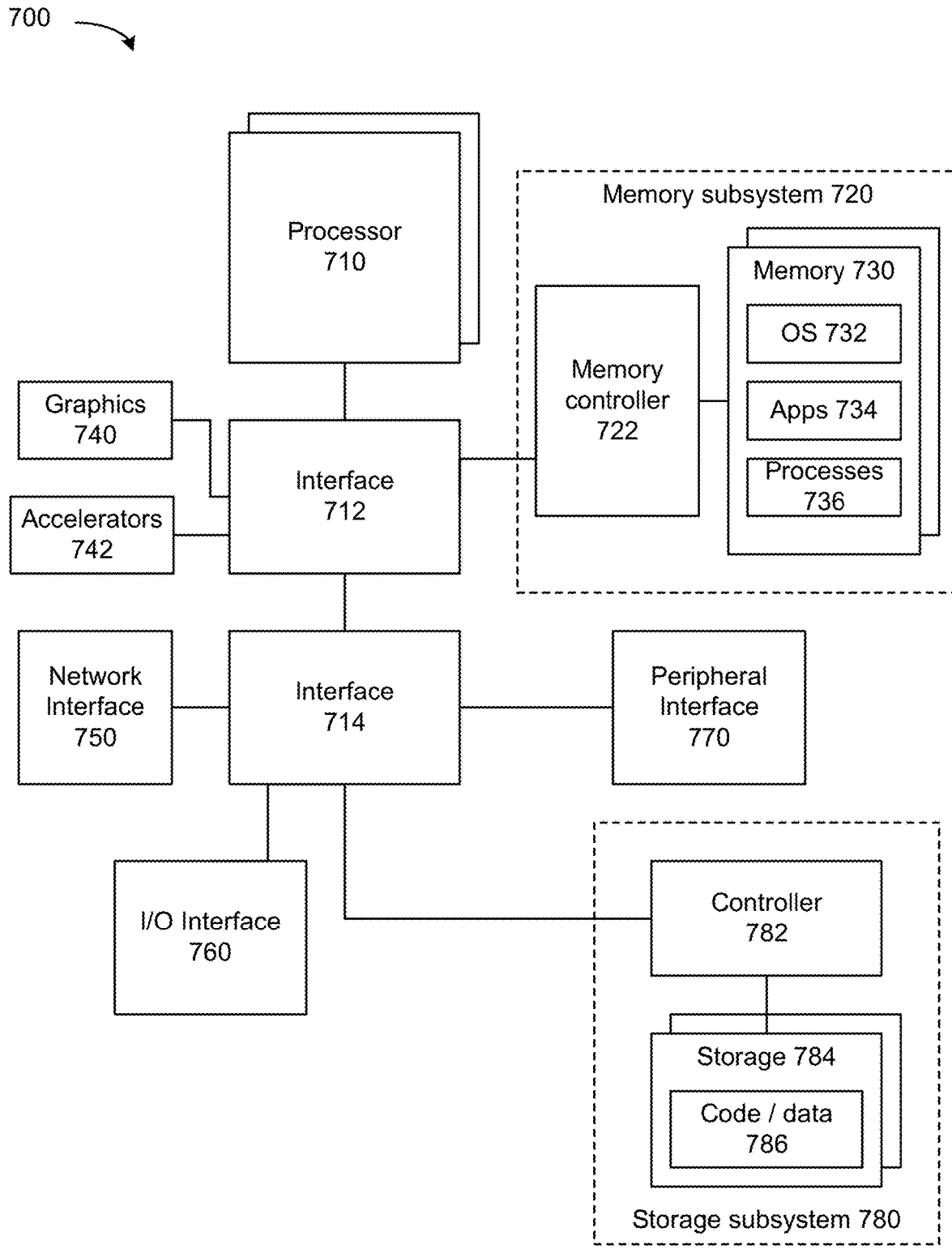
FIG. 7 depicts an example computing system.

FIG. 7 depicts an example computing system. Components of system 700 (e.g., processor 710, network interface 750, and so forth) can be used to perform replication of data as described herein. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices. Note that reference to GPU or CPU herein can in addition or alternatively refer to an XPU or xPU. An xPU can include one or more of: a GPU, ASIC, FPGA, or accelerator device.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model.

Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

In some examples, OS 732 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others.

In some examples, a driver can enable an application to utilize a network device to perform data replication in accordance with embodiments described herein.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include stand-alone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory.

Some examples of network interface 750 are part of an Infrastructure Processing Unit (IPU) or data processing unit (DPU) or utilized by an IPU or DPU. An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, edge servers, edge switches, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain examples require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z.""

Illustrative examples of the devices, systems, and methods disclosed herein are provided below. An embodiment of the devices, systems, and methods may include one or more, and combination of, the examples described below.

Example 1 includes one or more examples and includes a system comprising: a switch device comprising: one or more input ports to receive Ethernet packets; one or more output ports to output Ethernet packets; one or more packet processing pipeline to process packets after receipt from the one or more input ports and to process packets prior to transmission from the one or more output ports; a switch fabric to route a received packet at an input port of the one or more input ports to an output port of the one or more output ports; and circuitry to perform replication of content stored in a source memory region to two or more memory regions available from two or more nodes, wherein the two or more memory regions available from two or more nodes are identified to the circuitry for use to store replicated content.

Example 2 includes one or more examples, wherein the switch device comprises one or more of: a top of rack (ToR) switch or an infrastructure processing unit (IPU).

Example 3 includes one or more examples, wherein the two or more nodes are in different racks than that of a memory device that stores the source memory region.

Example 4 includes one or more examples, wherein the switch device is to select the two or more memory regions available from two or more nodes based, at least, in part on resiliency criteria associated with the two or more nodes.

Example 5 includes one or more examples, wherein the source memory region is designated so that a write of the content to the source memory region is to cause the switch device to transmit the content to two or more memory regions available from two or more nodes.

Example 6 includes one or more examples, wherein the switch device is to utilize a remote direct memory access protocol to transmit the content to the two or more memory regions available from two or more nodes.

Example 7 includes one or more examples and includes a platform comprising a processor to execute an application, wherein the application is to offload data replication to the switch device, the application is to access the content, and the content is subject to high availability and/or disaster recovery.

Example 8 includes one or more examples and includes a method comprising: a switch device receiving a command to perform replication of data associated with a target memory region; the switch device receiving identification of one or more memory regions of one or more nodes that are available to store replica data; and the switch device selecting at least one memory region from the one or more memory regions that are available to store replica data and the switch device transmitting a copy of data from the target memory region to the selected at least one memory region from the one or more memory regions.

Example 9 includes one or more examples, wherein the switch device selecting at least one memory region from the one or more memory regions that are available to store replica data is based, at least, in part on a resiliency factor associated with the at least one memory region from the one or more memory regions that are available to store replica data.

Example 10 includes one or more examples, wherein the resiliency factor comprises level of reliability of media and capability to transmit replicated data to a requester.

Example 11 includes one or more examples, wherein the one or more nodes are in different racks than that of a memory device that stores data associated with the target memory region.

Example 12 includes one or more examples, and includes based on a write of data to the target memory region, causing the switch device to transmit a copy of the written data to the selected at least one memory region.

Example 13 includes one or more examples, wherein the switch device transmitting a copy of data from the target memory region to the selected at least one memory region from the one or more memory regions comprises the switch device utilizing a remote direct memory access (RDMA) protocol to transmit the copy of data from the target memory region to the selected at least one memory region from the one or more memory regions.

Example 14 includes one or more examples, wherein the switch device comprises one or more of: a top of rack (ToR) switch or an infrastructure processing unit (IPU).

Example 15 includes one or more examples, and includes a non-transitory computer-readable medium comprising instructions, that if executed by one or more processors, cause the one or more processors to: receive a query to identify whether a switch device is capable to perform or not perform offload of data replication from an application by selection of memory regions to store replicated data from among one or more memory regions of one or more nodes; and provide a response to the query to identify whether the switch device is capable to perform or not perform offload of data replication from an application by selection of memory regions to store replicated data from among one or more memory regions of one or more nodes.

Example 16 includes one or more examples, and includes instructions, that if executed by one or more processors, cause the one or more processors to: based on a request to enable the switch device to perform offload of data replication from an application by selection of memory regions to store replicated data from among one or more memory regions of one or more nodes, configure the switch device to perform offload of data replication from an application by selection of memory regions to store replicated data from among one or more memory regions of one or more nodes.

Example 17 includes one or more examples, wherein the switch device receives an indication of memory regions available to store replicate data from the one or more nodes.

Example 18 includes one or more examples, wherein the one or more nodes are in different racks than that of a memory device that stores data that is to be replicated.

Example 19 includes one or more examples, wherein the switch device selects the one or more nodes from among available nodes based on resiliency criteria associated with the one or more nodes.

Example 20 includes one or more examples, wherein the resiliency criteria comprises a level of reliability of media that is to store replicated data and capability to transmit replicated data to a requester.

The invention claimed is:
1. A system comprising:
a switch device comprising:
one or more input ports to receive Ethernet packets;
one or more output ports to output Ethernet packets;
one or more packet processing pipelines to process packets after receipt from the one or more input ports and to process packets prior to transmission from the one or more output ports;
a switch fabric to route a received packet at an input port of the one or more input ports to an output port of the one or more output ports; and
circuitry to perform replication of content stored in a source memory region to two or more memory regions available from two or more nodes, wherein the two or more memory regions available from two or more nodes are identified to the circuitry for use to store replicated content;
wherein:
the switch device is to select the two or more memory regions available from the two or more nodes based, at least in part, upon media reliability data that is to be determined in a manner that is service provider-definable and/or tenant-definable; and
the circuitry to perform the replication comprises at least one match-action unit of the one or more packet processing pipelines.

2. The system of claim 1, wherein the switch device comprises one or more of: a top of rack (ToR) switch or an infrastructure processing unit (IPU).

3. The system of claim 1, wherein the two or more nodes are in different racks than that of a memory device that stores the source memory region.

4. The system of claim 1, wherein the switch device is to select the two or more memory regions available from two or more nodes based, at least, in part on resiliency criteria associated with the two or more nodes.

5. The system of claim 1, wherein the source memory region is designated so that a write of the content to the source memory region is to cause the switch device to transmit the content to two or more memory regions available from two or more nodes.

6. The system of claim 1, wherein the switch device is to utilize a remote direct memory access protocol to transmit the content to the two or more memory regions available from two or more nodes.

7. The system of claim 1, comprising:
a platform comprising a processor to execute an application, wherein the application is to offload data replication to the switch device, the application is to access the content, and the content is subject to high availability and/or disaster recovery.

8. A method comprising:
a switch device receiving a command to perform replication of data associated with a target memory region;
the switch device receiving identification of one or more memory regions of one or more nodes that are available to store replica data; and
the switch device selecting at least one memory region from the one or more memory regions that are available to store replica data and the switch device transmitting a copy of data from the target memory region to the selected at least one memory region from the one or more memory regions;

wherein:

the selecting of the at least one memory region is to be based, at least in part, upon media reliability data that is to be determined in a manner that is service provider-definable and/or tenant-definable;

the switch device comprises circuitry to perform (1) the selecting of the at least one memory region and (2) the transmitting of the copy of data from the target memory region to the selected at least one memory region from the one or more memory regions; and the circuitry comprises at least one match-action unit of one or more packet processing pipelines.

9. The method of claim 8, wherein the switch device selecting at least one memory region from the one or more memory regions that are available to store replica data is based, at least, in part on a resiliency factor associated with the at least one memory region from the one or more memory regions that are available to store replica data.

10. The method of claim 9, wherein the resiliency factor is based, at least in part, upon level of reliability of media and capability to transmit replicated data to a requester.

11. The method of claim 8, wherein the one or more nodes are in different racks than that of a memory device that stores data associated with the target memory region.

12. The method of claim 8, comprising:

based on a write of data to the target memory region, causing the switch device to transmit a copy of the written data to the selected at least one memory region.

13. The method of claim 8, wherein the switch device transmitting a copy of data from the target memory region to the selected at least one memory region from the one or more memory regions comprises the switch device utilizing a remote direct memory access (RDMA) protocol to transmit the copy of data from the target memory region to the selected at least one memory region from the one or more memory regions.

14. The method of claim 8, wherein the switch device comprises one or more of: a top of rack (ToR) switch or an infrastructure processing unit (IPU).

15. A non-transitory computer-readable medium comprising instructions, that if executed by one or more processors, result in performance of operations comprising:

receive a query to identify whether a switch device is capable to perform or not perform offload of data replication from an application by selection of memory regions to store replicated data from among one or more memory regions of one or more nodes; and provide a response to the query to identify whether the switch device is capable to perform or not perform offload of data replication from an application by selection of memory regions to store replicated data from among one or more memory regions of one or more nodes;

wherein:

the switch device is to select the one or more nodes based, at least in part, upon media reliability data that is to be determined in a manner that is service provider-definable and/or tenant-definable;

the switch device comprises circuitry to perform the offload of data replication from an application by selection of memory regions to store replicated data from among one or more memory regions of one or more nodes; and the circuitry comprises at least one match-action unit of one or more packet processing pipelines.

16. The non-transitory computer-readable medium of claim 15, comprising instructions, that if executed by one or more processors, cause the one or more processors to:

based on a request to enable the switch device to perform offload of data replication from an application by selection of memory regions to store replicated data from among one or more memory regions of one or more nodes, configure the switch device to perform offload of data replication from an application by selection of memory regions to store replicated data from among one or more memory regions of one or more nodes.

17. The non-transitory computer-readable medium of claim 16, wherein the one or more nodes are in different racks than that of a memory device that stores data that is to be replicated.

18. The non-transitory computer-readable medium of claim 16, wherein the switch device selects the one or more nodes from among available nodes based on resiliency criteria associated with the one or more nodes.

19. The non-transitory computer-readable medium of claim 18, wherein the resiliency criteria comprises a level of reliability of media that is to store replicated data and capability to transmit replicated data to a requester.

20. The non-transitory computer-readable medium of claim 15, wherein the switch device receives an indication of memory regions available to store replicate data from the one or more nodes.

* * * * *